A. L. KOENIG.
CARBONATOR.
APPLICATION FILED APR. 20, 1914.
1,291,554.
Patented Jan. 14, 1919.
6 SHEETS—SHEET 2.
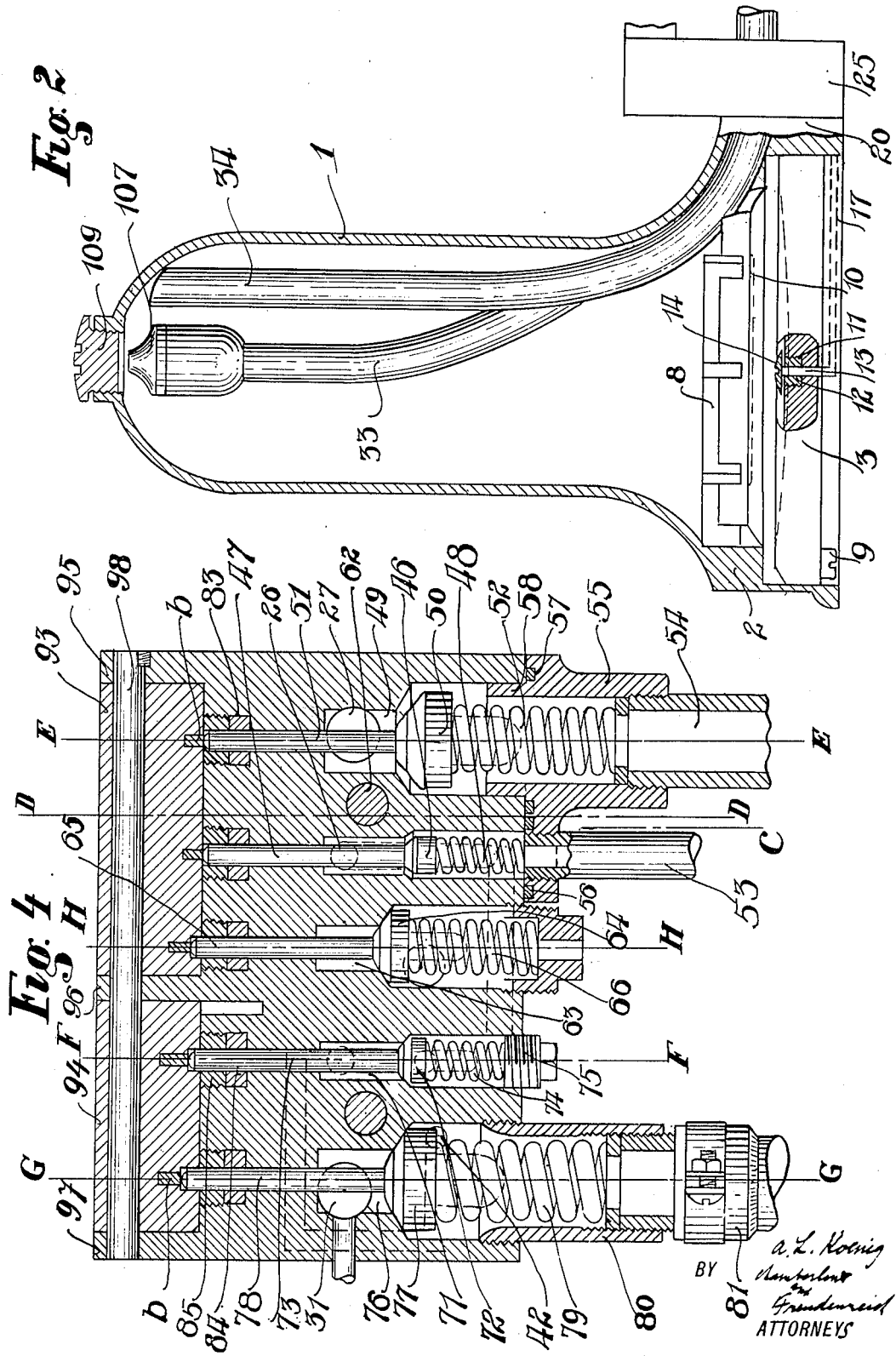

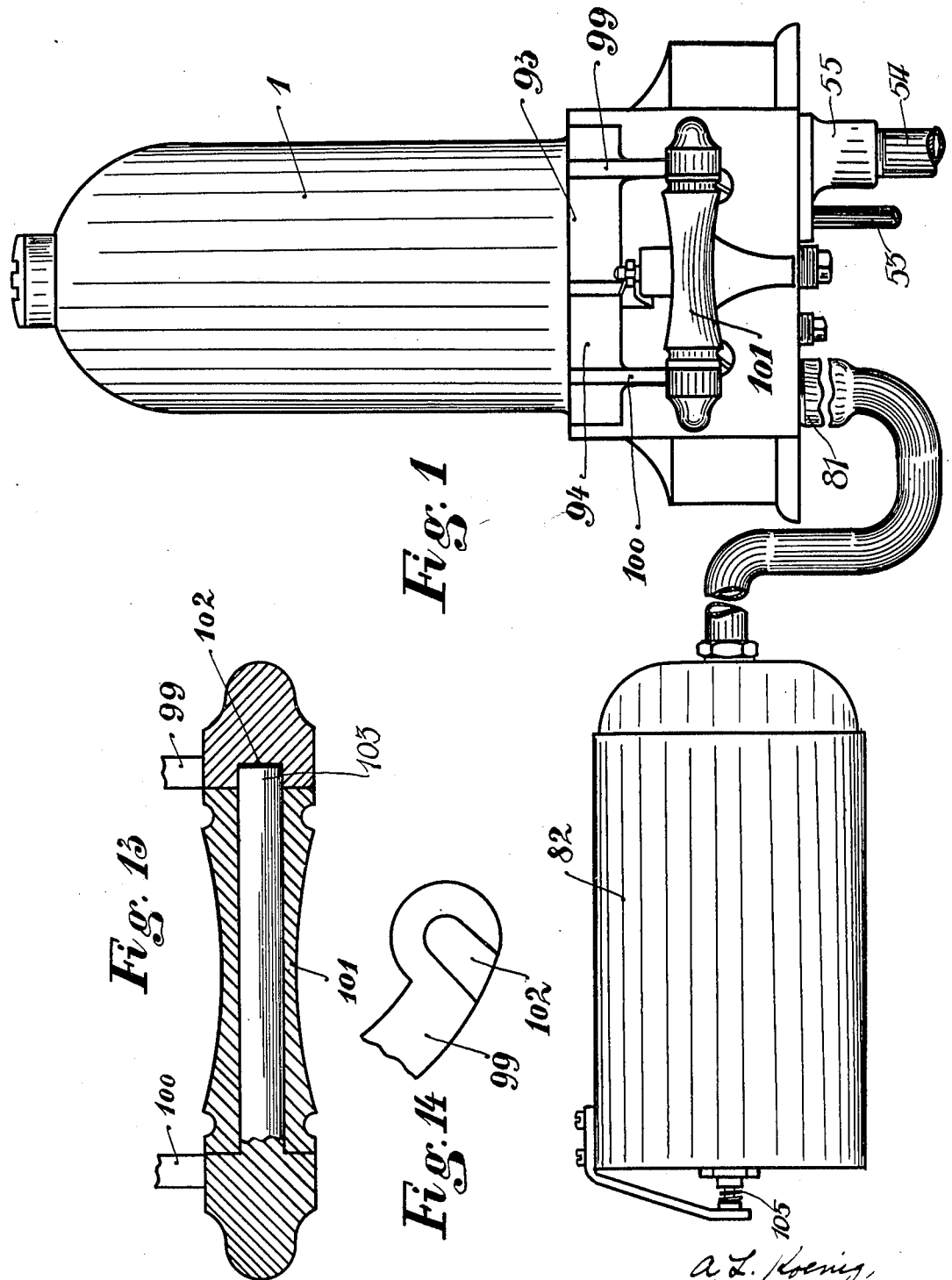

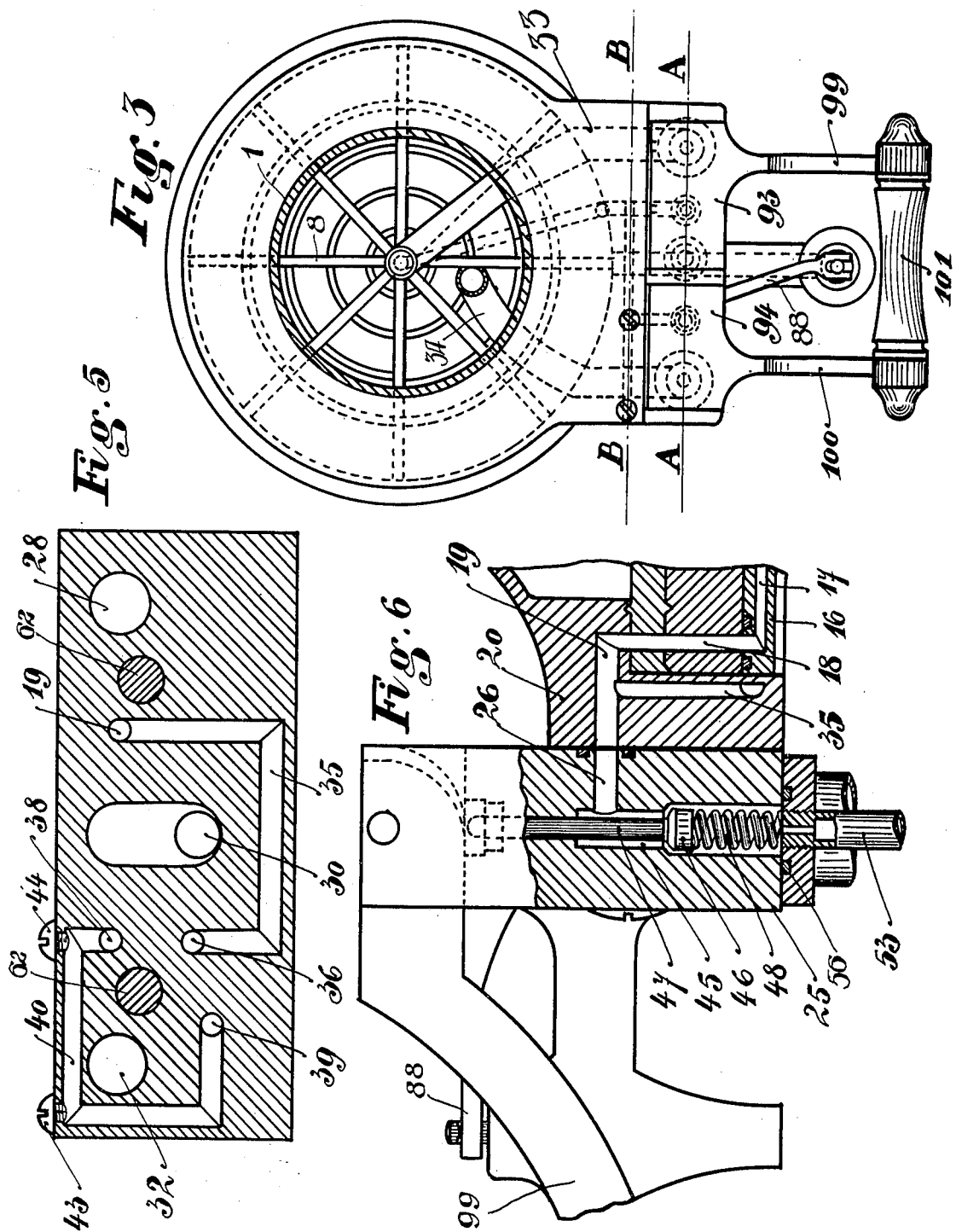

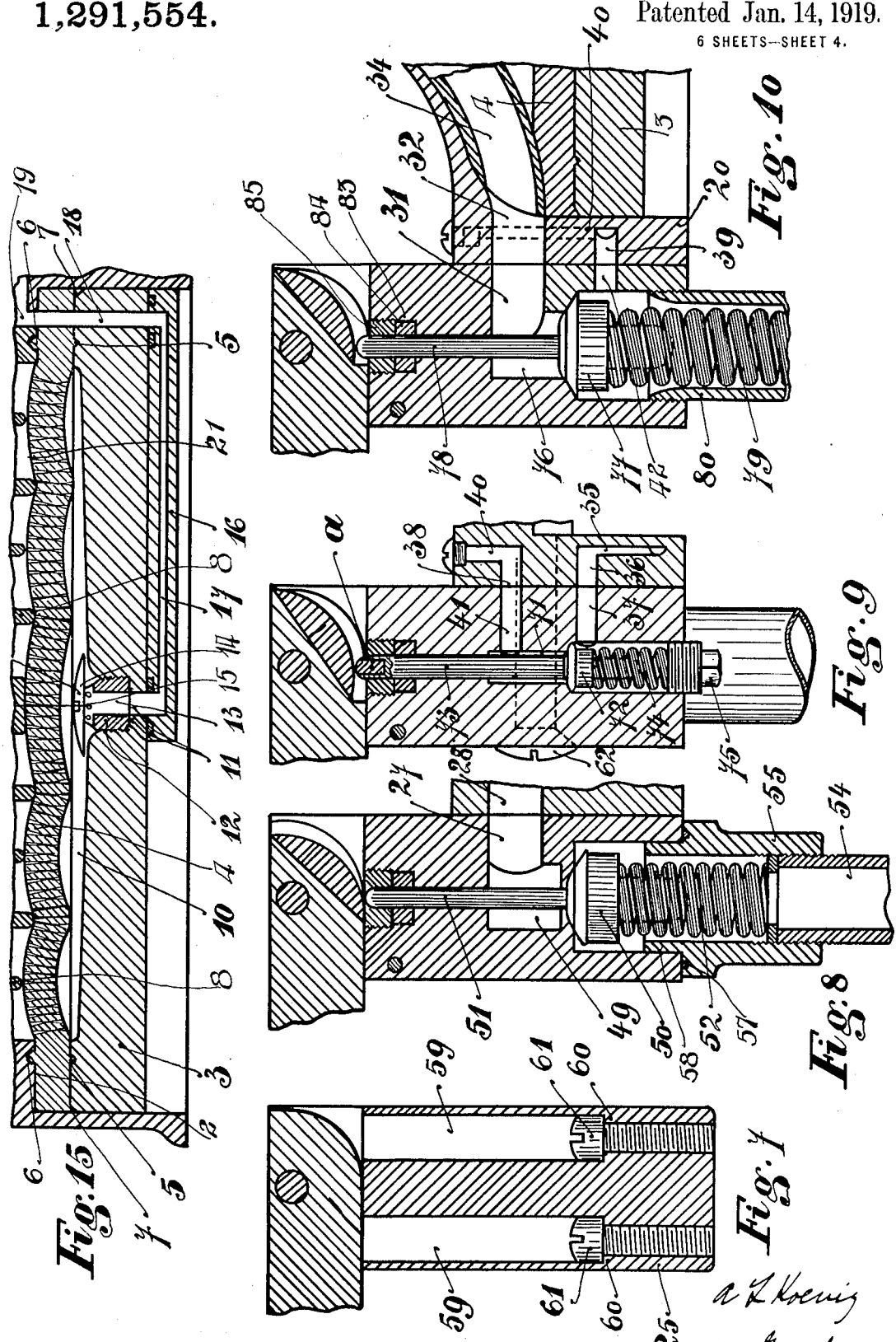

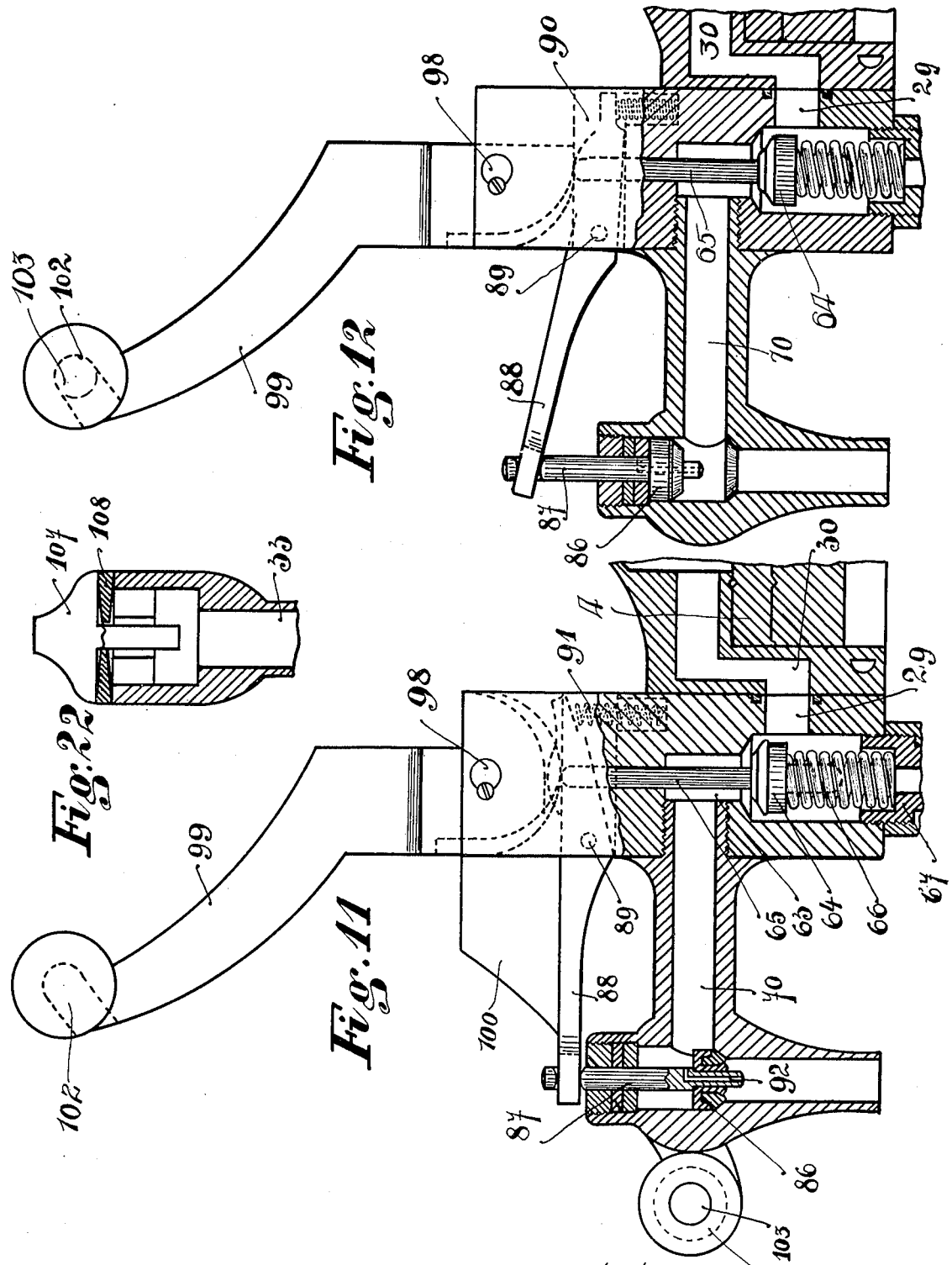

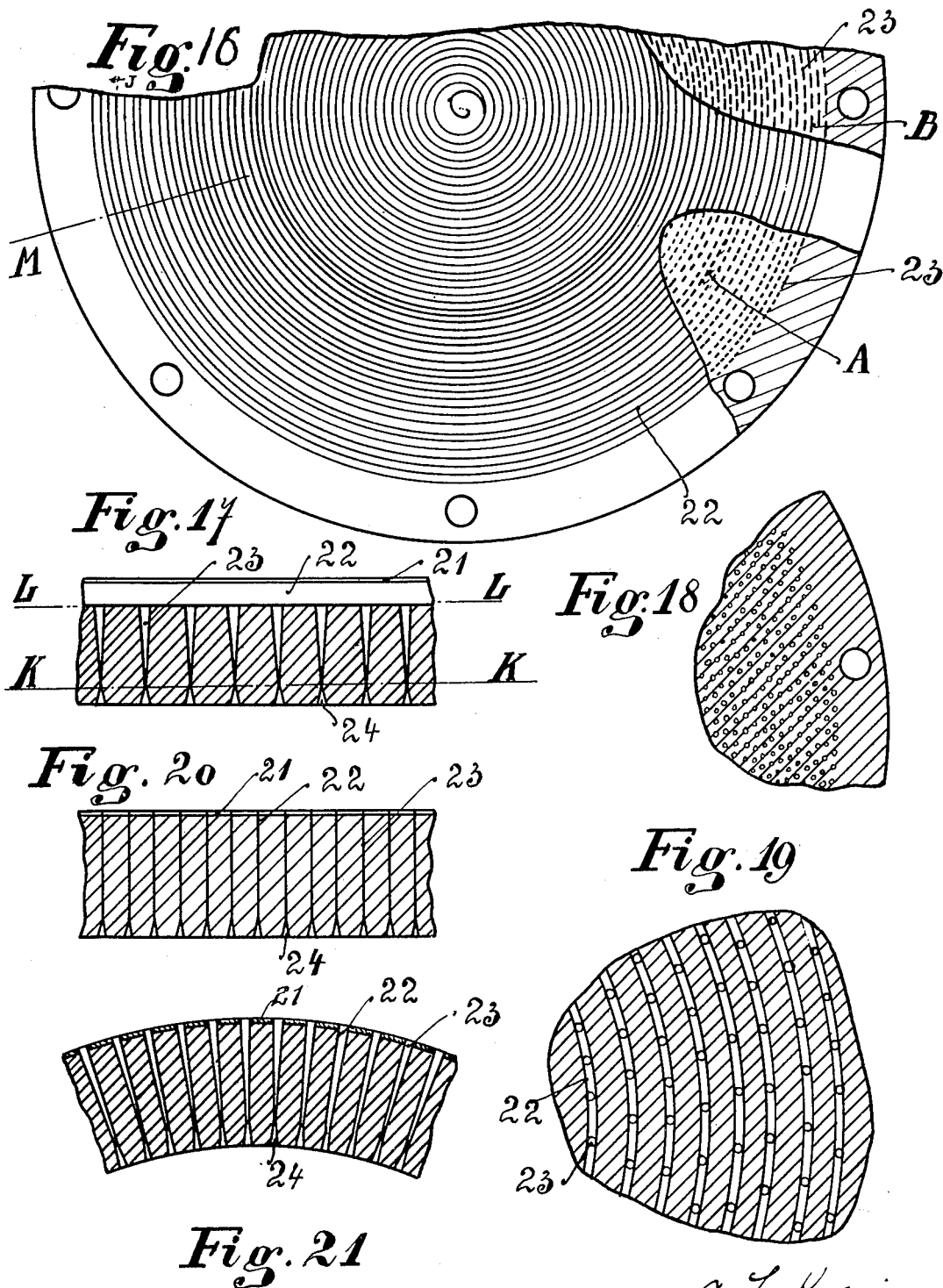

UNITED STATES PATENT OFFICE.

ALPHONSO L. KOENIG, OF CHICAGO, ILLINOIS, ASSIGNOR TO THE KOENIG CARBONATORS, (INC.), A CORPORATION OF ILLINOIS.

CARBONATOR.

1,291,554.      Specification of Letters Patent.      Patented Jan. 14, 1919.

Application filed April 20, 1914. Serial No. 833,041.

*To all whom it may concern:*

Be it known that I, ALPHONSO L. KOENIG, a subject of the Emperor of Austria, residing at Chicago, county of Cook, State of Illinois, have invented a certain new and useful Improvement in Carbonators, and declare the following to be a full, clear, and exact description of the same, such as will enable others skilled in the art to which it pertains to make and use the same, reference being had to the accompanying drawings, which form a part of this specification.

My invention relates to apparatus for carbonating liquid and delivering the same in a condition for immediate use or for storage in a siphon or other vessel. Specifically considered my invention relates to improvements in the construction shown in my prior Patent 1,028,365, granted June 4, 1912 and has for its object so to improve the structural details and the relation of parts of such an apparatus as to make the apparatus simple in construction and highly efficient and economical in operation.

A further object of my invention is so to construct and arrange the parts of a carbonating apparatus that inspection, repair and replacement of various parts may easily and conveniently be made.

A further object of my invention is to produce a simple and novel arrangement which will permit carbonated liquid to be delivered or dispensed successfully either at a high pressure or at a low pressure.

The various features of novelty whereby my invention is characterized will hereinafter be pointed out with particularity in the claims; but, for a full understanding of my invention and of its various objects and advantages, reference may be had to the following detailed description taken in connection with the accompanying drawings, wherein:

Figure 1 is a front elevation of an apparatus arranged in accordance with a preferred form of my invention;

Fig. 2 is a central vertical section taken approximately through the carbonator in a plane at right angles to the plane of Fig. 1;

Fig. 3 is a top plan view of the carbonator;

Fig. 4 is a section on an enlarged scale taken approximately on line 4—4 of Fig. 3;

Fig. 5 is a section on a scale corresponding to Fig. 4 taken approximately on line 5—5 of Fig. 3;

Fig. 6 is a section taken approximately on line 6—6 of Fig. 4;

Fig. 7 is a section on line 7—7 of Fig. 4;

Fig. 8 is a section on line 8—8 of Fig. 4;

Fig. 9 is a section taken approximately on line 9—9 of Fig. 4;

Fig. 10 is a section taken on line 10—10 of Fig. 4;

Fig. 11 is a section taken approximately on line 11—11 of Fig. 4, showing the condition of the parts during the operation of dispensing carbonated liquid at a high pressure;

Fig. 12 is a view similar to Fig. 11, illustrating the condition of the parts during the operation of dispensing carbonated liquid at a low pressure;

Fig. 13 is a horizontal section on an enlarged scale through the double handle which controls the discharge of carbonated liquid both at high pressure and at low pressure;

Fig. 14 is a side elevation of a fragment of one of the parts of the handle;

Fig. 15 is a central vertical section through the base of the carbonator;

Fig. 16 is a top plan view of the rubber diaphragm which forms the bottom of the carbonator, fragments being broken away to show the construction beneath the surface;

Fig. 17 is a section on an enlarged scale on line J of Fig. 16;

Fig. 18 is a section on line 18—18 of Fig. 17;

Fig. 19 is a section on line 19—19 of Fig. 17;

Fig. 20 is a section on line 20 of Fig. 16;

Fig. 21 is a view similar to Fig. 20, showing the condition of the diaphragm during the charging operation;

Fig. 22 is a detail of the outlet end of the delivery pipe for the liquid to be carbonated.

As in my aforesaid patent, the carbonating apparatus comprises in general a strong receptacle having a perforated rubber diaphragm across the bottom, together with means for admitting liquid to be carbonated and compressed gas for charging the liquid; as well as various valves and connections for controlling the incoming liquid and gas and the discharge of carbonated liquid; and my invention relates to improvements in these various features.

As will best be seen from Figs. 2 and 15 of the drawings, the main portion of the carbonator comprises a strong vessel 1, preferably cylindrical in form and flaring outwardly at the base which is open. Within the opening at the base, and at some distance from the bottom edge is an internal annular shoulder, 2, facing outwardly and lying next to the cylindrical wall of the base portion. Between this shoulder and a strong heavy plate, 3, is clamped a thick perforated rubber diaphragm 4. The plate 3 and the shoulder 2 are preferably provided with circular grooves, 5 and 6 and the upper, outer edge of the plate is preferably beveled as indicated at 7, thus permitting annular ridges to be formed along that portion of the rubber which lies between the shoulder and the plate, when the plate is fastened securely in position and preventing the withdrawal of the rubber. Above the rubber diaphragm is a spider, 8, similar to the one shown in my aforesaid patent, for shaping the upper surface of the diaphragm into a series of short arches as viewed in radial section or a series of concentric convex rings as viewed in the plan. The plate 3 may be fastened in position in any suitable way, preferably by means of bolts or heavy screws, 9, which pass through the plate and into the annular shoulder 2. In the top of the plate 3 is a radial channel, 10, extending diametrically across the same, although it may of course take any other suitable shape or course. Through the center of the plate is an opening, 11, counter-sunk on the upper side for the purpose of receiving a screw plug, 12, which in turn has an opening 13 registering with the smaller section of the opening 11. The plug 12 has a head 14 on the upper end by which it may be screwed in place, the length of the plug being such that the bottom of the head does not quite touch the bottom of the channel or concavity 10 in the top of the plate. Just underneath the head of the plug is a transverse passage, 15, communicating with the opening 13. Therefore compressed gas introduced from beneath the plate 3 through the opening 11, passes up through the plug and is deflected laterally by the under side of the head into the channel or concavity in the top of the plate. On the under side of the plate is fixed a hollow bar or casting, 16, extending from the center to the side which is the front of the carbonator. The member 16 has therein a passage 17 which communicates at one end with the opening 11 and at its other end with an opening or passage 18 extending up through the plate 3 and the edge of the rubber disk at the front of the machine where it terminates in a forwardly extending branch, 19, having its outlet in the flat front of a block 20 secured to or forming part of the base of the receptacle. As will hereinafter appear, the compressed gas with which liquid contained in the receptacle is to be charged, is introduced beneath the diaphragm through the passages or channels 19, 18, 17 and 11.

It is characteristic of rubber that when compressed carbon dioxid is passed through a perforated disk made of such material, such as the disk 4 in the present instance, in order to charge the overlying body of water, the carbon dioxid seems to collect in a thin film and across the surface in contact with the water. When the pressure in the system is relieved in order to permit the discharged water to be dispensed at a low pressure this free carbon dioxide appears to shoot up through the water and gather up the molecules of carbon dioxid in its path so that great quantities of gas which should stay in the water are given off and the water which is dispensed is flat and contains very little carbon dioxid. I have found that by covering the upper surface of the rubber disk or bottom with a fabric, preferably silk, this objectionable action is overcome and water may be dispensed fully charged and will retain the carbon dioxid for a long time. I therefore cover the top of the disk or diaphragm with a fine fabric, 21, preferably of silk, secured in any suitable way to the diaphragm.

As explained in my aforesaid patent, the perforations through the diaphragm should be such that when the diaphragm or disk lies flat the upper surface will present a substantially unbroken appearance, the outlet ends of the openings or perforations being closed as nearly as possible. It is impossible to form these perforations without leaving slight burs and therefore even when the outlet ends of the perforations are substantially closed there will be, in the ordinary arrangement, numerous minute projections which militate greatly against permanency in the charging of the liquid. The fabric covering, however, will serve to conceal these little projections to a great extent so that there will be substantially no rubber in contact with the water when the diaphragm lies flat. However, I have devised means for greatly reducing the amount of roughness on the rubber itself, such means consisting in cutting long slits into the top surface of the rubber through the fabric and leading the perforations through the rubber from the bottom of these slits. The slits may have any desired length and be disposed in any desired way. The slits can most conveniently be formed in circles or preferably in a single spiral as indicated at 22, the spiral beginning at the center of the diaphragm and continuing out to the point where the diaphragm engages the holding surfaces between which it is clamped in place. The perforations are then formed by cutting through the rubber with a thin flat tapered knife, the flat side of which engages with the sides of that portion of the groove at which a perforation is being made. In this way perforations 23, extending from the bottoms of the groove almost to or entirely to the bottom surface of the diaphragm are produced, these perforations having the appearance of wedge-shaped openings when viewed in the direction at right angles to the length of the spiral slit, and the appearance of simple straight slits when viewed in the direction of the length of the spiral slit; Figs. 17 and 20 being views taken in the two directions transverse to and along the spiral slit. On the under side of the diaphragm I prefer to have each perforation terminate in a downwardly and outwardly-flaring mouth 24. When the diaphragm lies flat the spiral slit is closed as indicated in Figs. 16 and 20 while the perforations are also closed as indicated in these two figures. When the diaphragm is subjected to pressure from beneath, it changes from the condition shown in Fig. 20 to that shown in Fig. 21, the slit or slits 22 opening and the perforations 23 being expanded from mere slits to inverted conical openings having conical mouths on the under side of the diaphragm, and the compressed gas passes up through these openings and out through the top of the slits 22 which now have the shape of channels or grooves. The fragment marked A in Fig. 16 shows the condition of the lower ends of the perforatione 23 when the disk is flat while Fig. 18 shows how the perforations have been expanded into rounded openings at this point. In the same way the fragment marked B in Fig 16 shows the condition of the outlet ends of the perforations 23 while the diaphragm lies flat, while Fig. 19 shows how these outlet ends of the perforations have been expanded into round openings of considerable size.

The silk covering for the rubber possesses the further advantage of holding the water in the carbonator out of contact with the rubber so that the water standing in the carbonator for a considerable length of time is not affected in any way by the rubber.

One of the principal features of my invention has to do with the valve mechanism for controlling the flow of the fluids and governing the pressures so as to make it possible to dispense the charge liquid satisfactorily.

The valve mechanism is all contained in or carried by a block 25 secured to the front face of the member 20, placing this mechanism in a compact form and permitting all of the fitting and finishing to be done on a comparatively small piece which is afterward attached to the base of the receptacle. The member 25 has a port or passage 26 registering with the passage 19 in the member 20; a passage 27 registering with a passage 28 through the member 20; a passage 29 registering with a passage 30 through the member 20; and a passage 31 registering with a passage 32 through the member 20. The passages 26 and 19 are for the purpose of conveying compressed gas to the under side of the diaphragm forming the inner bottom of the main receptacle; the passages 27 and 28 are for supplying water to be charged into the receptacle, the passage 28 leading into the lower end of a pipe 33 contained in the receptacle and extending to a point near the top thereof; the fresh water therefore entering the receptacle at the top without disturbing the charged water which the receptacle happens to contain at a time when fresh water is entering. The passages 29 and 30 are for the purpose of conducting charged water from the receptacle, the passage 30 opening into the receptacle at a point just above the flexible bottom, so that the charged water is withdrawn from that portion of the mass of water in the receptacle which is certain to be the most highly charged; and the passages 31 and 32 are for the purpose of permitting the escape of accumulated gas above the charged water when water is to be delivered or dispensed at a low pressure, the passage 32 communicating with an open-ended pipe 34 contained in the receptacle and extending up to a point above the high water level in the receptacle. In addition to the passages which I have just described and which may be termed the main passages, there are a number of other registering passages between the members 20 and 25. Thus the member 20 contains within itself a U-shaped tunnel or channel 35 connecting the main gas passage 19 with a passage 36 opening out of the front face of the member 20, and the passage 36 registers with a passage 37 in the block or valve casing 25. Directly above the passage 36 is a similar passage 38 connected to another similar passage 39, lying below the passage 32, by a channel or tunnel 40 contained in the member 20. In the member 25 are passages 41 and 42 registering, respectively, with the passages 38 and 39. A portion of the tunnel or channel 40 lies near the top of the member 20 and at separated points therein are screw-threaded openings extending out through the top and normally closed by screws 43 and 44, the screws being removable for testing purposes as will hereinafter appear.

I shall now describe the manner in which the several passages to which I have referred are controlled.

The main gas passage 26 opens into a vertical chamber 45 open at the bottom of the valve casing. In this chamber, below the passage 26, is an upwardly-seating valve 46 having a stem 47 extending up through the top of the valve casing, and provided with a spring 48 which constantly tends to seat the valve. In the same way, the fresh-water passage 27 opens into a valve chamber 49 open at the bottom and containing a valve 50 similar to but larger than the valve 46, the valve 50 having a stem 51 extending up through the top of the casing and being provided with a spring 52 which constantly tends to close it. Compressed gas and a liquid are delivered to the valve chambers 45 and 49, respectively, through pipes 53 and 54, respectively.

I prefer to attach the pipes 53 and 54 to the valve casing in such a manner that they may be detached easily, permitting the casing to be taken off the carbonator without disturbing the pipes and leaving the casing free from the pipes when it is removed. To this end I screw or otherwise attach the pipes 53 and 54 to a fitting 55 which is detachably fastened to the underside of the valve casing in any convenient way and brings the pipes (or passages in the fitting which in effect form continuations of the pipes,) into registration with the valve chambers 45 and 49. Suitable annular packing rings 56 and 57, arranged between the fitting and the casing about the mouths of the valve chambers, serve to make the joint gas-tight and water-tight. I prefer to provide the fitting with a hub or annular flange 58 adapted to fit within the lower end of the valve chamber 49 and thus accurately position the fitting and holding it against bodily lateral displacement. The manner of securing the fitting in place is best shown in Fig. 7, there being two holes, 59, bored vertically through the valve casing at a point between the valve chambers 45 and 49, the openings being reduced in size near the bottom to provide upwardly-facing shoulders 60. Screws 61 are inserted through the holes until the heads rest upon the shoulders, the lower ends of the screws passing down into the fitting. By tightening the screws the fitting is drawn tightly against the underside of the valve casing. The valve casing itself is preferably fastened to the base of the receptacle by means of two strong screws 62 passing through it from front to back, and therefore the valve casing may quickly be detached from the receptacle and from the supply pipes by simply unfastening four screws.

The passage 29, for charged water, opens into a valve chamber 63 but below an upwardly-closing valve 64 instead of above such a valve as is the case with the gas and fresh water passages 26 and 27. The valve 64 has a stem 65 extending out through the top of the casing and there is a spring 66 beneath the valve for normally holding it closed. The valve chamber 63 preferably opens out through the bottom of the casing, a closure in the form of a screw plug, 67, being provided therefor. As will be seen most clearly in Figs. 11 and 12, the valve chamber 63 communicates at its upper end with a faucet 70 through which the charged water is delivered when the valve 64 is open.

The passages 37 and 41 communicate with a valve chamber 71, the one below and the other above a normally seated upwardly-seating valve 72 having a stem 73 extending up through the top of the casing. Beneath the valve is a spring 74 resting upon a plug 75 screwed into and forming a closure for the bottom of the valve chamber.

The passages 31 and 42 communicate with a valve chamber 76, the one above and the other below a normally closed upwardly-seating valve 77 having a stem 78 projecting up through the top of the valve casing. A spring 79 beneath the valve serves to hold it normally closed. Into the bottom of the valve chamber is screwed a coupling 80 to which is attached a flexible tube 81 leading to the flexible container 82 similar to the container 75 in my aforesaid patent.

The several valve stems are preferably arranged in a single straight row extending across the top of the valve casing and each is provided with a suitable packing to prevent the escape of fluid. In the arrangement shown, the valve casing is counterbored around the upper end of each valve stem, as indicated at 83, and in each counterbore is a suitable packing 84 held in place by a nut 85 surrounding and having a sliding fit on the stem. Each stem, in its extreme upper position, projects only a slight distance above the nut which holds the packing in place, thus reducing the danger of corrosion of the stems to a minimum. In the upper end of each stem I prefer to place a small piece of hard steel, $a$, having only its upper surface exposed. Thus a hard wearing surface is obtained in such a manner that no steel surfaces, except the actual wearing surface at the top, is exposed, and rusting of the steel is therefore prevented.

The faucet 70 is so designed that charged water may successfully be delivered thereby either at a high pressure or at a low pressure. To this end there is arranged in the faucet a valve 86 lying between the inlet end and the outlet end. The valve has a vertical stem 87 projecting out through the faucet, and through the upper end of this stem is connected to the front or outer end of a lever 88 pivotally supported between its ends, at 89, in a slot 90 in the top of the valve casing. Under the rear end of the lever is a spring 91 which, acting through the lever, normally holds the valve 86 closed. The valve 86 has a small port or passage, 92, extending therethrough so that the inlet end of the faucet and the outlet end are always in communication with each other, the communication being through the restricted passage or port when the valve 86 is closed and being full and unrestricted when the valve is open.

In order to dispense charged water at high pressure it is sufficient to shut off the incoming water and the incoming gas and admit the charged water to the faucet while the valve in the faucet remains closed; the charged water being discharged through the restricted passage in the faucet. In other words, for dispensing charged water at a high pressure it is only necessary to allow the valves 46 and 50 to close and the valve 64 to open; no operation of the valve 86 in the faucet or of the valves 72 and 77 in the valve casing being required. In order to dispense water at a low pressure, the gas pressure in the top of the receptacle and beneath the rubber diaphragm must be released and a full opening through the faucet must be provided. Therefore, for dispensing water at a low pressure, the valves 72 and 77 in the casing and the valve 86 in the faucet must be opened in addition to opening the valve 64 and closing the valves 46 and 50. I have therefore provided a simple divided operating handle or double operating handle by means of which the proper relation of parts may be obtained for dispensing either at a high or a low pressure.

In the arrangement shown, the stems of the valves 46, 50 and 64 constitute one group of members to be controlled, while the stems of the valves 72 and 77 and the lever 88 constitute a second group of such members; these two groups lying side by side as viewed from the front of the carbonator. Two cam bars, 93 and 94, are mounted on top of the valve casing, each in operative relation to one of said groups of members to be controlled. In the particular arrangement illustrated, these cam bars lie between ears 95 and 96 and between the ear 96 and an ear 97, respectively; a stationary shaft 98 passing through the three ears and the two cam bars and holding the bars revolubly in place. The cam bar 93 has an arm 99 extending forwardly therefrom and at right angles thereto while the cam bar 94 has a similar, similarly disposed arm 100. The arm 100 has at its front end a grip or handhold 101, fixed at one end to the arm and projecting laterally into proximity to the front end of the arm 99. As best shown in Figs. 13 and 14, the front end of the arm 99 has in the side facing the other arm a curved slot 102, closed at the top and open at the bottom, the slot being curved in the arc of a circle having the pivotal axis of the arm for a center. On the free end of the grip or hand hold is a projection, 103, adapted to be received in the curved slot, 102. It will be seen that if the arm 99 is grasped and lifted, the grip or handhold 101 will remain at rest; the cam bar 93 being actuated without affecting the other cam bar. On the other hand, if the handhold or grip is grasped and raised it will lift both the arm 100 and the arm 99 and will actuate both cam bars.

In the cam bars are set segmental steel inserts $b$ each in a position to coöperate with one of the valve stems; these inserts, like those in the stems, having no exposed surfaces which can be attacked by rust when the apparatus is in use.

The flexible container 82 with its valve 105 is identical with the rubber bag 75 and its valve in my prior patent and therefore requires no other explanation than that it is intended to receive gas from the carbonator, allow such gas to escape, if necessary to produce the desired low pressure for dispensing charged water at low pressure, and supply the charging receptacle with gas as charged water is withdrawn to compensate for the water so withdrawn.

The upper or outlet end of the fresh water pipe 33 is preferably provided with a simple gravity-actuated check valve, 107, having a concave rubber disk 108 on its face. This valve permits the delivery of water but prevents charged water from being forced back into the pipe 33 in case the water level rises above the top of the pipe and the pressure in the receptacle is greater than the pressure in the fresh-water main. A suitable removable plug, 109, in the top of the receptacle just above the check valve allows access to be had to the valve.

The operation is as follows: The valves 46 and 50 being normally open when the operating handle is in its position of rest, water flows from the pipe 54 past the valve 50, through the passages 27, 28 and the pipe 33 into the receptacle. Compressed gas flows from the supply pipe 53 through the restricted passage 53$^a$, past the valve 46, through the passages and channels 26, 19, 18, 17, 11, 13 and 15 into the channel or concavity 10 on the under side of the rubber diaphragm 4. As the gas accumulates under the diaphragm and the pressure rises, the diaphragm assumes the configuration illustrated in Figs. 15 and 21, gas bubbles rising up through the perforations 23 and slits 22 and entering the water to charge the same. Some of the gas bubbles pass up through the water and rise into the space in the top of the receptacle so that eventually the vessel becomes filled with charged water above which is a body of gas having the approximately same pressure as that beneath the diaphragm. When the pressure in the receptacle becomes greater than the pressure of the incoming water the check valve 107 closes and no more water enters. When the pressure on opposite sides of the diaphragm becomes equalized, the resiliency of the diaphragm causes it to flatten out, closing the slits and perforations, so that no more gas enters.

When it is desired to dispense water at a high pressure, the member 99 of the operating handle is raised, (as shown in Fig. 11) causing the gas valve 46 and then the water valve 50 to close, and finally opening the valve 64 controlling the outlet to the faucet. Charged water under high pressure now flows directly from the bottom of the receptacle, where the most highly charged water is always to be found, through the passages 30 and 29, and past the valve 64 to the faucet where it must go through the restricted port or passage 92 before being discharged. The charged water is therefore delivered at a high pressure but in restricted quantities so that it is under complete control.

When it is desired to dispense charged water at a low pressure, the entire operating handle is raised by grasping the grip or handhold 101. This results in the following cycle of operations: The main gas valve 46 and then the fresh water valve 50 are closed; then the valves 72 and 77 are opened in succession; and finally the valve 86 in the nozzle and the valve 64 are opened, although it is immaterial at just what stage the valve 86 is opened, it being preferably opened simultaneously with or in advance of the valve 64. What follows from this manipulation of the valves is this: The supply of compressed gas and of fresh water is cut off by valves 46 and 50; then the space beneath the rubber diaphragm is connected to the flexible container 82 through the tunnel 35, (which connects with the supply passage 19) passages 36 and 37, past the valve 72, through the passages 41 and 38, through the tunnel 40, passages 39 and 42, through the lower portion of the valve chamber 76, and through the flexible conduit 81; the gas space or chamber in the top of the main receptacle is connected to the container 82 through pipes 34 in the receptacle, through the passages 32 and 31, through the valve chamber 76 past the open valve 77, and through the conduit 81; and a free passage from the interior of the receptacle through the faucet is provided through the opening of the valves 86 and 64. In other words, through the mere raising of the handle, the water and gas supply are shut off, the gas space in the receptacle and beneath the rubber diaphragm are connected to the flexible container and the pressure reduced, and then the faucet is opened to permit charged water to be delivered under the low pressure so produced. As the charged water is dispensed, gas flows back from the container 82 into the receptacle to take the place of the water which has left the receptacle.

When the handle is released, the valves 64, 72 and 77 and the valve 86 in the faucet automatically close while the gas valve 46 and the water valve 50 automatically open. Consequently water and gas enter the receptacle in the manner heretofore described so as to replenish the supply of charged water.

It will be seen that if the valves 46 and 50 should happen to leak a little it would be of no consequence, while a leak in the valve 64 would immediately be detected by a dripping at the faucet. However, should the valve 72 or the valve 77 leak, there would be a continuous loss of compressed gas. Furthermore, if such a leak should be discovered, it would be difficult to determine whether it occurred at the valve 72 or at the valve 77. I have therefore provided the set screws 43 and 44 at opposite ends of an arm of the tunnel 40 which connects with the chambers containing the valves 72 and 77. By removing these screws and noting from which of the openings thus left there is an escape of gas, if either or both of the valves are leaking so that there will be escaping gas, the valve which is at fault can quickly be discovered.

I claim:

1. In a carbonator, the combination of a receptacle for liquid, means for admitting liquid to said receptacle, a perforated rubber disk in the lower portion of the receptacle, a fabric coating on the upper side of said disk, and means for admitting compressed gas below the disk.

2. In a carbonator, the combination of a receptacle for liquid, a perforated disk of rubber in the bottom of the receptacle, a covering of thin flexible material on the upper side of the disk and surrounding the perforations therein, and means for supplying compressed gas beneath the disk.

3. In a carbonator, the combination of a receptacle for liquid, means including a perforated rubber member for admitting minute streams of compressed gas into the receptacle, a covering of thin flexible material for the rubber on the side next to the liquid, and means for admitting gas under pressure upon the opposite side of the rubber.

4. In a carbonator, the combination of a receptacle for liquid, means including a perforated rubber member for admitting into the receptacle compressed gas in the form of minute streams, a covering of silk on the side of the rubber next to the liquid, and means for applying gas under pressure upon the opposite side of the rubber.

5. A device for use in carbonators comprising a rubber disk covered on one side with silk and having numerous grooves cut into the same through the silk and having also perforations extending through the same from the bottoms of said grooves.

6. A device for use in carbonators comprising a rubber disk having numerous long slits cut partway through the same from one side thereof and also having perforations extending at intervals from the bottom of the slits to the opposite side.

7. A device for use in carbonators comprising a rubber disk having numerous long slits cut partway through the same from one side thereof and also having perforations extending at intervals from the bottom of the slits to the opposite side, the ends of the perforations on the latter side of the disk being enlarged.

8. A device for use in carbonators comprising a rubber disk having numerous grooves cut into the same and having also perforations extending through the same from the bottoms of said grooves.

9. In combination with a carbonator, an expansible receptacle, a connection from the said receptacle to the top of the carbonator, a combined cut-off and safety valve located in said connection and arranged to open outwardly from the carbonator, a spring for holding the valve closed against pressure in the carbonator, and a manually-operable device for opening said valve.

10. In combination, a carbonator for containing carbonated liquid, means including a perforated rubber disk contacting on the inner side with the liquid in the carbonator for introducing gas under pressure into the carbonator, an expansible receptacle, and means for simultaneously connecting the top of the carbonator and the space on the outer side of the disk with said receptacle.

11. In combination, a receptacle for carbonated liquid, a perforated rubber disk forming an inner false bottom for the receptacle, means for introducing liquid into the receptacle at a point above the disk, a gas conduit opening into the center of the bottom of the receptacle below the disk, and a deflector arranged over the discharge end of the gas conduit for the purpose of spreading the incoming gas.

12. In combination, a receptacle for carbonated liquid, a perforated rubber disk forming an inner false bottom for the receptacle, means for introducing liquid into the receptacle at a point above the disk, the upper surface of the main bottom of the receptacle being concave, a gas conduit opening into the receptacle at the lowest point in the concave upper surface of the main bottom, and means for simultaneously discharging liquid from said receptacle and venting said conduit.

13. A carbonator having a false bottom in the form of a perforated rubber disk and a passage for gas under pressure opening beneath said disk, a gas pipe connected to said passage, the pipe and the passage communicating with each other through a minute opening, and a valve in said passage.

14. In a carbonator, two independent pressure-relief valves one subjected to the pressure in the carbonator and the other to the pressure on the inlet side of the carbonator, there being a passage extending between the outlet sides of the valves, and there being also two separated test openings leading from said passages, one of said openings being nearest to one of said valves and the other opening being nearest to the other valve.

15. A device for use in carbonators comprising a rubber disk slitted partway through the same in long spirals and also having perforations extending at intervals from the bottom of the slits to the opposite side of the disk.

In testimony whereof, I sign this specification in the presence of two witnesses.

ALPHONSO L. KOENIG.

Witnesses:
 WM. F. FREUDENREICH,
 RUTH E. ZETTERVALL.